(12) United States Patent
Lee et al.

(10) Patent No.: US 7,155,921 B2
(45) Date of Patent: Jan. 2, 2007

(54) AIR CONDITIONING SYSTEM AND AIR CONDITIONING METHOD

(75) Inventors: Won Hee Lee, Seoul (KR); Yoon Jei Hwang, Seoul (KR); Chan Ho Song, Gwacheon-si (KR)

(73) Assignee: LG Electronics Inc., Seoul (KR)

(*) Notice: Subject to any disclaimer, the term of this patent is extended or adjusted under 35 U.S.C. 154(b) by 436 days.

(21) Appl. No.: 10/693,885

(22) Filed: Oct. 28, 2003

(65) Prior Publication Data

US 2004/0194482 A1 Oct. 7, 2004

(30) Foreign Application Priority Data

Jan. 13, 2003 (KR) .................. 10-2003-0002062

(51) Int. Cl.
- *F25B 49/00* (2006.01)
- *F25B 13/00* (2006.01)
- *F25D 15/00* (2006.01)
- *F24F 3/14* (2006.01)
- *F24F 11/00* (2006.01)

(52) U.S. Cl. .................. 62/176.1; 62/176.6; 62/160; 62/331; 236/49 A; 236/44 C (58) Field of Classification Search ............. 62/176.1, 62/176.6, 331, 160; 236/44 A, 44 C
See application file for complete search history.

(56) References Cited

U.S. PATENT DOCUMENTS

| | | | | |
|---|---|---|---|---|
| 3,833,052 A | * | 9/1974 | Cardinal | ................. 165/228 |
| 3,943,841 A | * | 3/1976 | Huang | ................. 99/470 |
| 4,726,197 A | * | 2/1988 | Megrditchian | ................. 62/309 |
| 4,968,457 A | * | 11/1990 | Welch | ................. 261/39.1 |
| 5,309,726 A | * | 5/1994 | Asbridge | ................. 62/91 |

(Continued)

FOREIGN PATENT DOCUMENTS

JP        5-1830        1/1993

(Continued)

OTHER PUBLICATIONS

English language Abstract of JP 5-1830.

(Continued)

*Primary Examiner*—Cheryl Tyler
*Assistant Examiner*—B. Clayton McCraw
(74) *Attorney, Agent, or Firm*—Greenblum & Bernstein, P.L.C.

(57) ABSTRACT

A driving method of an air conditioning system is disclosed. The air conditioning system includes a first cooling device combined with a heating function and having a compressor, an outdoor heat exchanger, an expansion device, a passage control device and an interior heat exchanger, a second cooling device provided at an outlet side of the blower and having a cooling pad containing moisture and ventilating, a tank storing refrigerant, a pump, a sprayer and a filter, a control unit electrically connecting to the first and second cooling devices and a humidity sensor and alternatively driving the first cooling device and the second cooling device according to humidity of outdoor air delivered from the humidity sensor during air conditioning mode. The driving method of the present invention includes steps of measuring humidity of outdoor air at the humidity sensor when the power of the air conditioning system is on; comparing humidity of outdoor air with predetermined humidity; driving a first cooling device circulating refrigerant by using a compressor for cooling the interior when humidity of outdoor air is higher than predetermined humidity, and driving a second cooling device sucking outdoor air with low relative humidity, increasing the relative humidity through humidifying and cooling process and providing the air into the interior for cooling the interior when humidity of outdoor air is lower than predetermined humidity.

19 Claims, 4 Drawing Sheets

U.S. PATENT DOCUMENTS 5,857,350 A * 1/1999 Johnson et al. ............... 62/314
5,970,723 A * 10/1999 Kinkel et al. ................. 62/121
6,116,033 A * 9/2000 Yoshiya ........................ 62/91
6,129,285 A * 10/2000 Schafka .................... 236/44 C
6,202,429 B1 * 3/2001 Kinkel et al. ................. 62/171

FOREIGN PATENT DOCUMENTS

JP        11-294788        10/1999
KR        20-0283883       7/2002

OTHER PUBLICATIONS

English language Abstract of Korea 20-0283883.
English language Abstract of JP 11-294788.

* cited by examiner

AIR CONDITIONING SYSTEM AND AIR CONDITIONING METHOD

CROSS-REFERENCE TO RELATED APPLICATIONS

This application claims the benefit of Korean Application No. P2003-0002062, filed on Jan. 13, 2003, which is hereby incorporated by reference as if fully set forth herein.

BACKGROUND OF THE INVENTION

1. Field of the Invention

The present invention relates to an air conditioning system and an air conditioning method, and more particularly, to the air conditioning system and the air conditioning method alternatively operating either a compression-type air conditioner or an evaporation-type air conditioner according to humidity of outdoor air in air conditioning mode.

2. Discussion of the Related Art

A cooling system is a kind of air conditioner cooling such interior as a living room, a dining room, a library and an office. In general, the cooling system includes a compressor, an outdoor heat exchanger (condenser), an expansion unit, and an indoor heat exchanger (evaporator) and cools the interior by refrigerant flow.

Here, the compressor sucks and compresses a low pressure and low temperature refrigerant and send a high pressure and high temperature refrigerant out. And, the refrigerant flowed out from the compressor flows into the outdoor heat exchanger and flows out after heat radiating process in the outdoor heat exchanger.

The refrigerant flowed out from the condenser flows into the expansion unit to be expanded to be suitable for evaporation. The expanded refrigerant flows back into the compressor after cooling the interior by going through an endothermic process in the indoor heat exchanger.

When outside temperature is higher than inside temperature, the temperature of the interior maintains lower temperature than outdoor temperature by a cycle of refrigerant aforementioned. Also, when heat is generated from various kinds of machine or a computing device provided in indoors, the temperature of the interior is prevented from being increased.

However, the cooling device by a compressor has problems as follows. First of all, when the refrigerant used in the cooling device is compressed, high noises and heavy vibrations are generated. The noises and vibrations generated from driving the compressor are main noises and vibrations from the cooling device and make a user displeased.

The cooling device by the compressor consumes large amount of electricity. Especially power consumption by the compressor places heavy weight and raises a problem in saving energy.

Also, the cooling device by the compressor works in isolation of indoor air. The indoor air becomes dry and impure after operating the cooling device by the compressor for a predetermined time. Therefore, ventilation is needed. However, heat loss is generated during the ventilation.

To cope with the above mentioned problems, there is needed a development of a cooling system generating less noises and vibrations, economizing electric power and reducing heat loss during ventilation.

SUMMARY OF THE INVENTION

Accordingly, the present invention is directed to an air conditioning system and an air conditioning method that substantially obviates one or more problems due to limitations and disadvantages of the related art.

An object of the present invention is to provide an air conditioning system generating less noises and vibrations and economizing electric power in air conditioning mode.

Another object of the present invention is to provide the air conditioning system reducing heat loss during ventilation in air conditioning mode.

Another object of the present invention is to provide a driving method of the air conditioning system consuming electric power according to humidity of outdoor air and effectively driving by minimizing heat loss.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air conditioning system including a compression type air conditioner, an evaporation type air conditioner, and a control unit electrically connected to the evaporation-type cooling device and a humidity sensor and alternatively driving the compression-type air conditioner and the evaporation type air conditioner according to humidity of outdoor air transmitted from the humidity sensor in air conditioning mode.

In another aspect of the present invention, the compression-type air conditioner includes a compressor compressing a refrigerant to a high temperature and high pressure state and releasing the compressed refrigerant, an outdoor heat exchanger carrying out heat exchange between the refrigerant and outdoor air, an indoor heat exchanger carrying out heat exchange between the refrigerant and indoor air, a passage control device alternatively guiding the compressed refrigerant to either the outdoor heat exchanger or the indoor heat exchanger according to a cooling or heating mode and an expansion device provided between the outdoor heat exchanger and the indoor heat exchanger for expanding the refrigerant.

Meanwhile, the evaporation-type cooling device includes a blower sucking in and blowing outdoor air into the interior, and a humidifying device provided at an outlet side of the blower for supplying moisture to the air passing through.

The humidifying device includes a cooling pad made of well-ventilated material containing moisture. In more detail, it includes a plurality of holes through which air passes.

The blower includes a fan, in more detail, an axial flow fan or a centrifugal fan.

Meanwhile, the evaporation-type cooling device further includes a tank storing refrigerant, a pump pumping refrigerant stored in the tank and a sprayer spraying the pumped refrigerant into the cooling pad.

Also, the evaporation-type cooling device provided at a side of the cooling pad further includes a filter removing dirt contained in the outdoor air.

In more detail, the filter can be provided between the blower and the cooling pad or at the outlet side of the cooling pad for removing dirt flowed in together with the outdoor air.

Meanwhile, a driving method of the air conditioning system provided to achieve the object of the present invention includes steps of measuring humidity of outdoor air at the humidity sensor when the power of the air conditioning system is on; comparing humidity of outdoor air with predetermined humidity; driving a first cooling device circulating refrigerant by using a compressor for cooling the interior when humidity of outdoor air is higher than predetermined humidity and driving a second cooling device cooling the interior by sucking outdoor air with low relative humidity, increasing the relative humidity through humidifying and cooling process and providing the air into the interior when humidity of outdoor air is lower than predetermined humidity.

The driving method of the air conditioning system generates less noises and vibrations, economizes electric power and reduces heat loss during ventilation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Function of an air conditioning system will be explained to help understand the present invention. The air conditioning system has a function of adjusting air temperature, humidity, an air motion and air cleanliness in a specified area according to a use. For example, the function of the air conditioning system is cooling or heating an indoor room such as a house, an office and a restaurant. On the other hand, a cooling system cools all indoor rooms and corresponds to a kind of the air conditioning system.

In general, the air conditioning system includes a compressor, an outdoor heat exchanger, an expansion device and an indoor heat exchanger. The air conditioning system cools or heats interior by changing a state of a flowing refrigerant through heat exchange.

Figure 1:
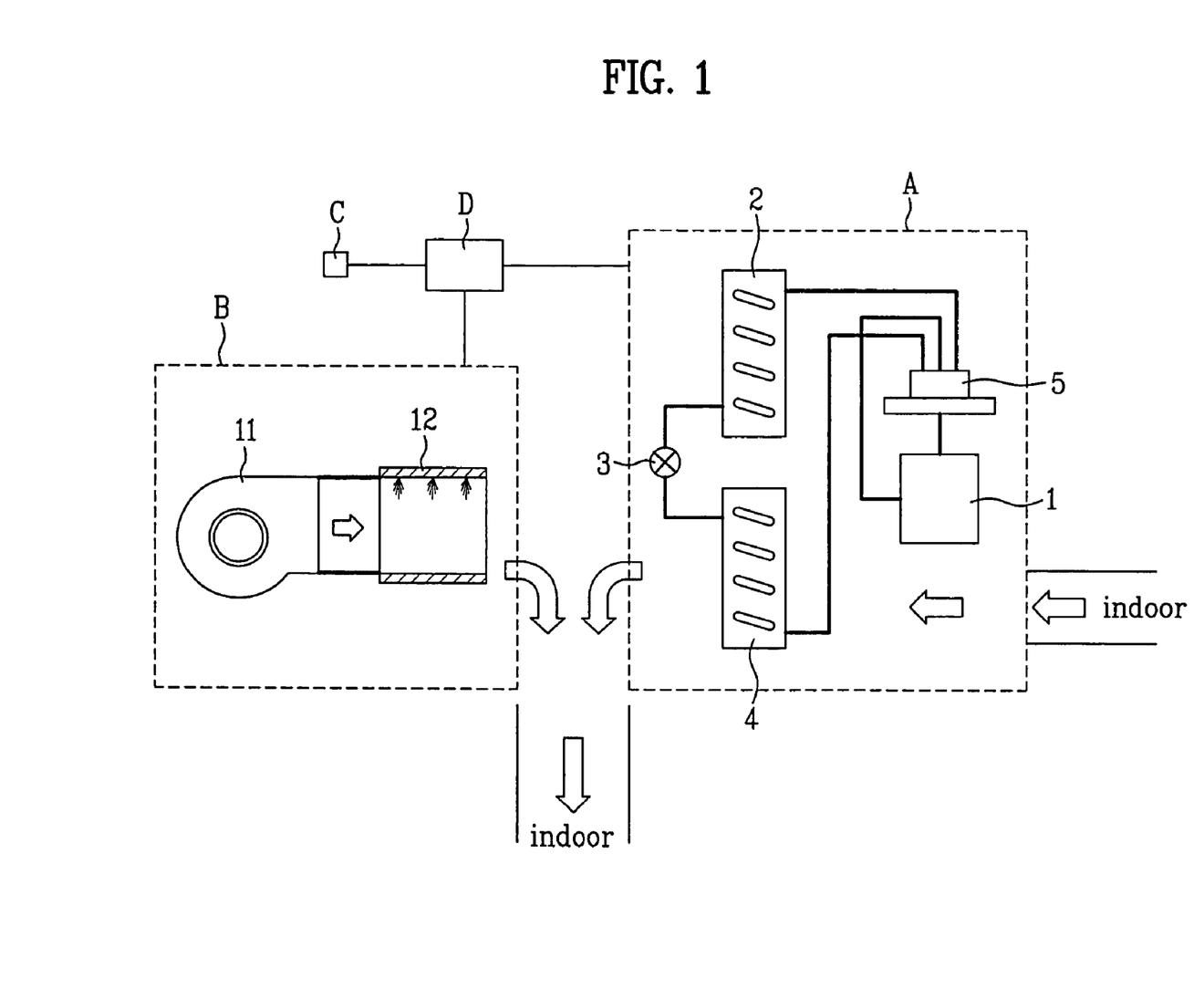
FIG. 1 illustrates a schematic view of an air conditioning system according to the present invention.
Figure 2:
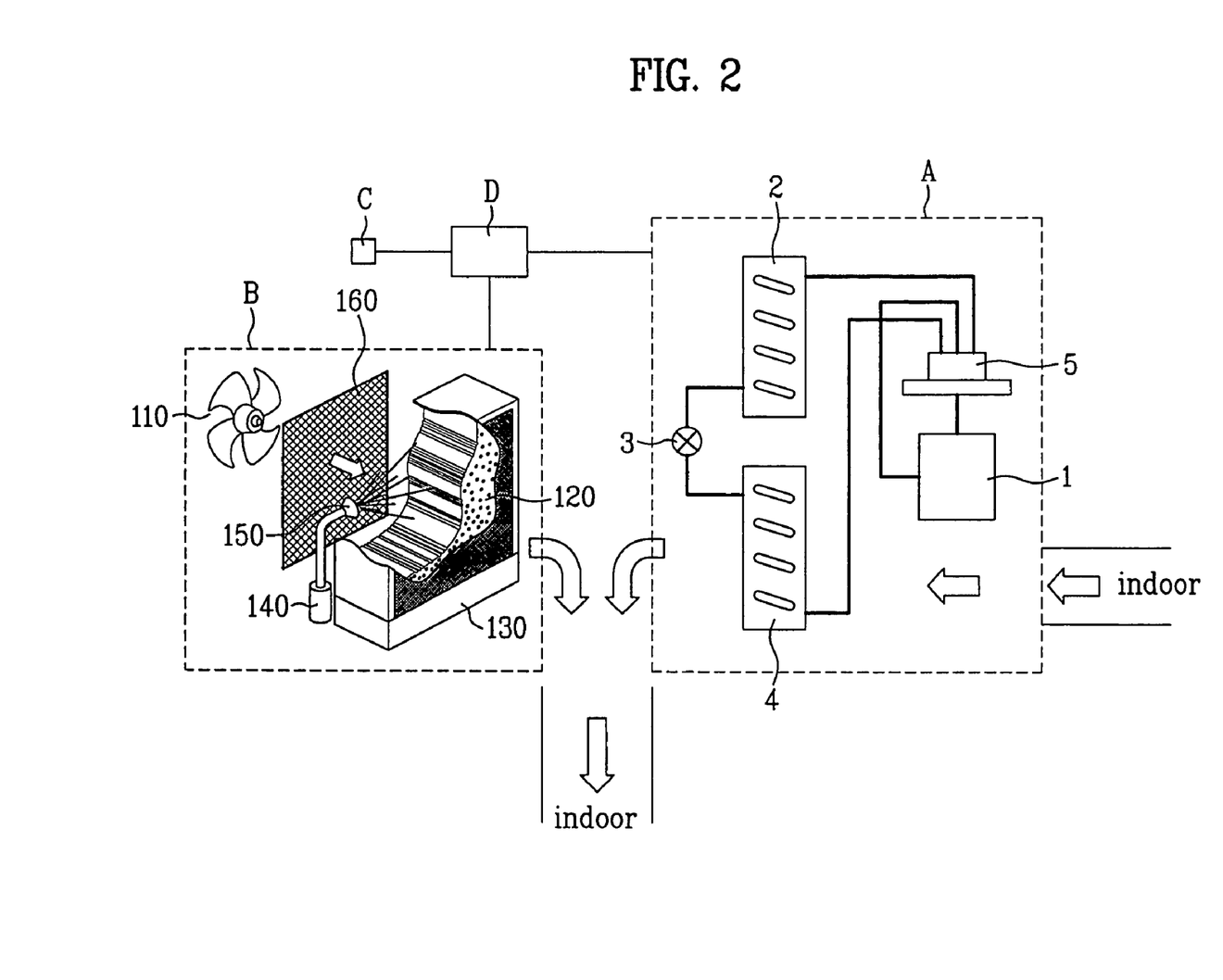
FIG. 2 illustrates a structural view of an air conditioning system according to the present invention.

FIG. 1 is a schematic view illustrating a configuration of the air conditioning system according to the present invention. FIG. 2 is a configuration of a first embodiment of the present invention.

Referring to FIG. 1, the air conditioning system includes a compression-type air conditioner A; an evaporation-type cooling device B; a humidity sensor C measuring humidity of outdoor air; and a control unit D electronically connected to the compression-type air conditioner A, the evaporation-type cooling device B and the humidity sensor C so as to alternatively drive either the compression-type air conditioner or the evaporation-type cooling device according to the humidity of outdoor air transmitted from the humidity sensor C.

The compression-type air conditioner A includes a compressor 1 compressing a refrigerant to a high temperature and high pressure state and discharging the compressed refrigerant; an outdoor heat exchanger 2 carrying out heat exchange between the refrigerant and outdoor air; an indoor heat exchanger 4 carrying out heat exchange between the refrigerant and indoor air; and a passage control device 5 alternatively guiding the compressed refrigerant to either the outdoor heat exchanger or the indoor heat exchanger according to the cooling or heating mode; and an expansion device 3 provided between the outdoor heat exchanger and the indoor heat exchanger for expanding the refrigerant. The passage control device 5 can include an erosion control valve.

The compression-type air conditioner drives either cooling or heating mode. The heating process by the compression-type air conditioner A includes steps that the refrigerant compressed to the high-temperature and high-pressure state at the compressor 1 flows into the indoor heat exchanger 2 to exchange heat with indoor air after passing through the passage control device 5. That is, the refrigerant expanded to the low-temperature and low-pressure state at the expansion device discharges heat into indoor air. The expanded refrigerant at the expansion device 3 flows into the outdoor heat exchanger 4 to exchange heat with outdoor air. That is a process of absorbing heat from outdoor air.

The cooling process of the compression-type air conditioner A includes steps that the refrigerant compressed to a high-temperature and high-pressure state at the compressor 1 flows into the outdoor heat exchanger 2 to exchange heat with outdoor air after passing through the passage control device 5. That is, the refrigerant expanded to a low-temperature and low-pressure state at the expansion device after generating heat into outdoor air. The expanded refrigerant at the expansion device 3 flows into the indoor heat exchanger 4 to exchange heat with indoor air. That is a process of absorbing heat of indoor air.

Hereinafter an operation of the compression-type air conditioner in cooling mode will be explained. The compression-type air conditioner A is called as a first cooling device and the evaporation-type cooling device B is called as a second cooling device.

The second cooling device includes a blower 11 sucking in and blowing outdoor air into the interior and a humidifying device supplying humidity to outdoor air passing through the outlet of the blower.

The cooling process of the second cooling device includes steps that outdoor air of low humidity is sucked and blown into the interior by the blower 11, and passes through the interior of the humidifying device 12 provided at an inside of the blower 11 for a humidifying and cooling process. Air of low-temperature and high-humidity cools the interior.

Figure 3A:
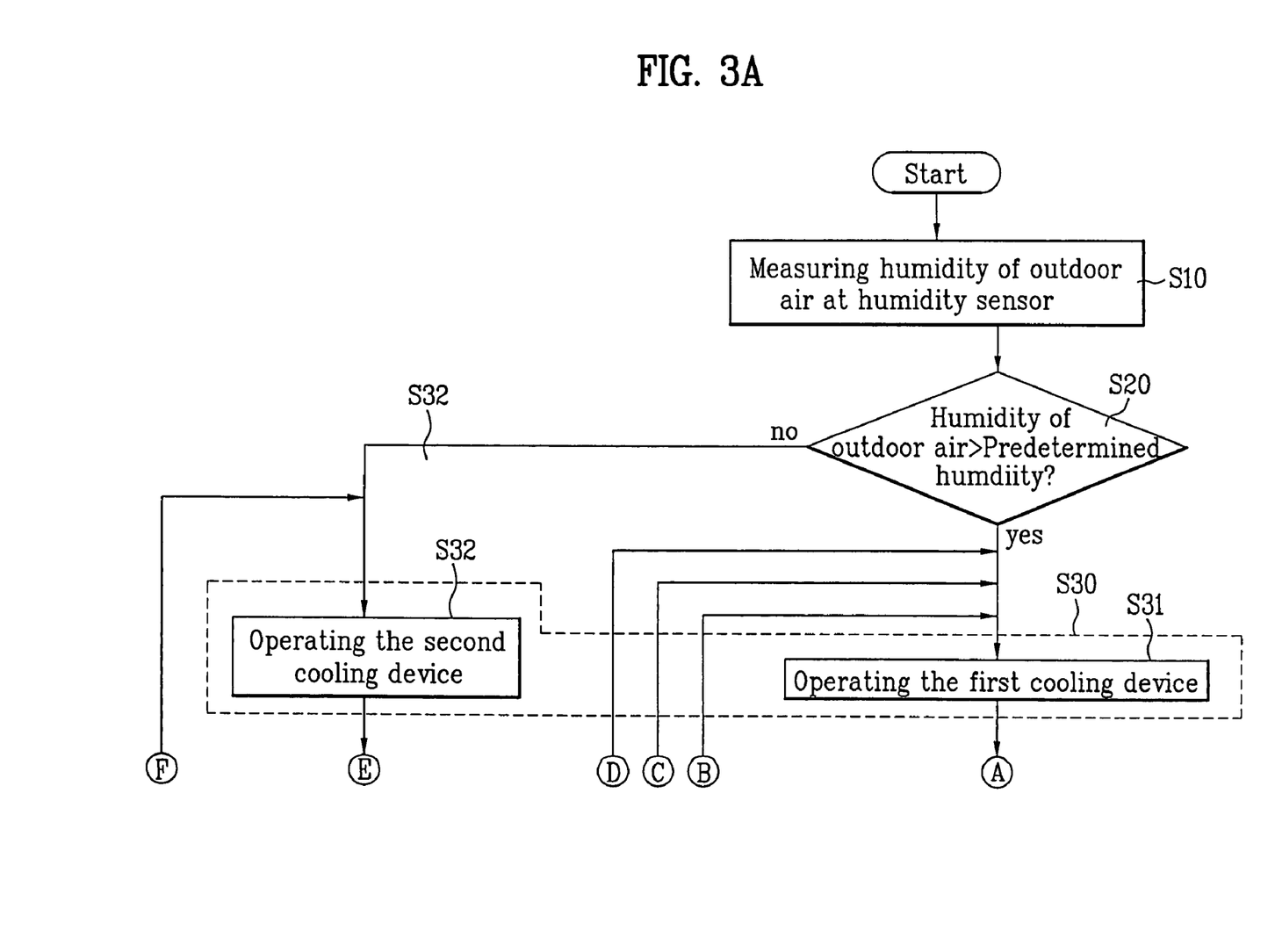
FIGS. 3A and 3B illustrate a drawing illustrating the driving method of an air conditioning system in cooling mode in order according to the present invention.
Figure 3B:
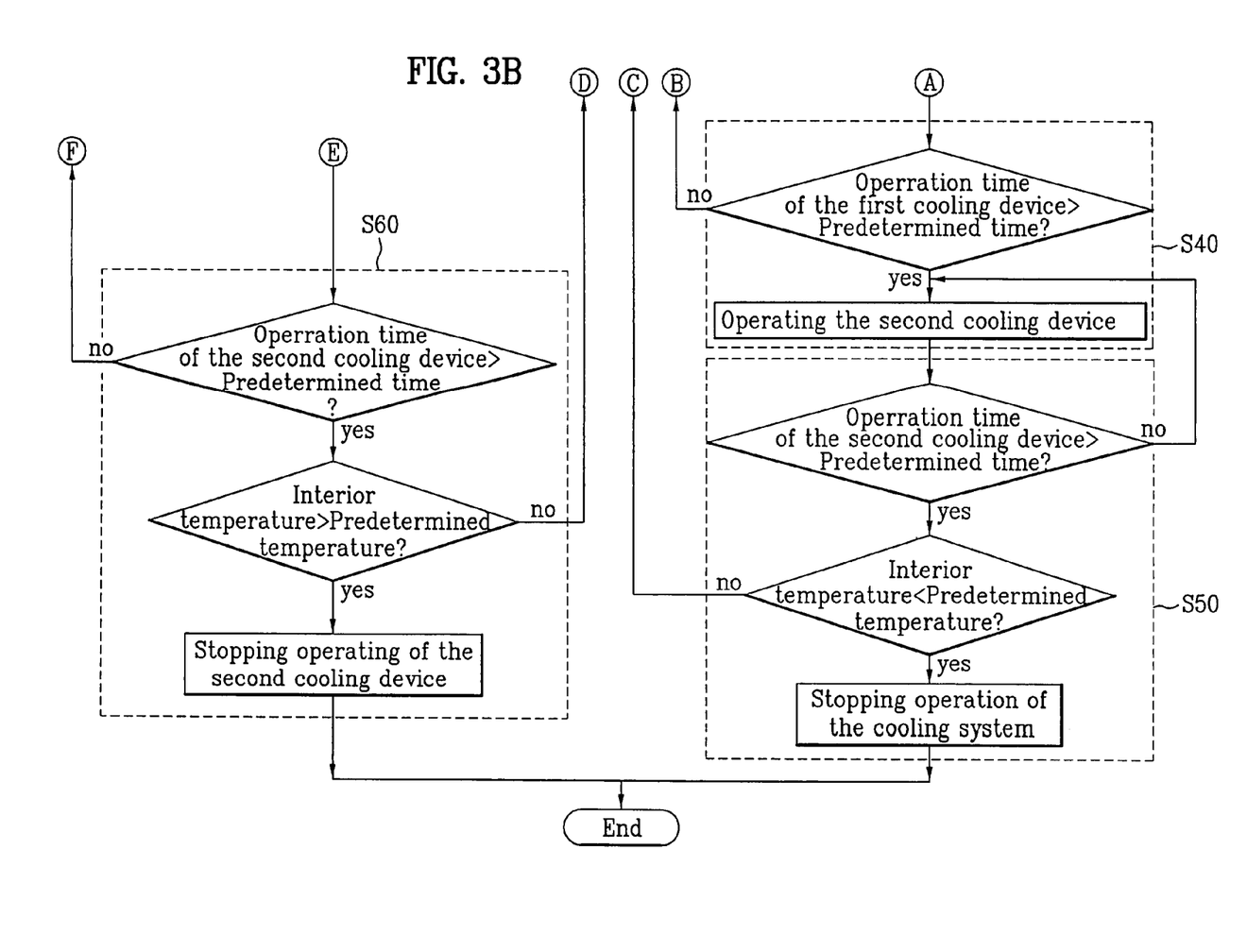

Hereinafter, an embodiment according to the present invention will be explained referring to FIG. 2 and FIGS. 3A and 3B. The basic composition of the present invention according to the embodiment is the same as aforementioned, and the same explanation will be omitted. The following is characteristic composition, connections, and an action of system and a driving method according to the embodiment.

As illustrated in FIG. 2, a basic composition and an action of the first cooling device are the same as mentioned above and will be omitted.

Meanwhile, the humidifying device 12 of the second cooling device B of FIG. 1 includes a cooling pad 120 made of well-ventilated material containing moisture. In more details, the cooling pad having an absorptive property includes a plurality of holes through which air passes. The blower 11 includes a fan, specifically, an axial flow fan 110 or a centrifugal fan. That is, outdoor air is blown into the interior by rotations of the blower.

The second cooling device B also includes a tank 130 for storing refrigerant. The tank can be provided at anywhere such as a top surface, a side or a bottom surface of the cooling pad. Only if when the tank is provided at a lower place than the cooling pad, the second cooling device B further includes a pump 140 for pumping up the refrigerant stored in the tank and a sprayer 150 for spraying the pumped refrigerant to the cooling pad.

In this case, it is desirable that the sprayer is provided at the air inlet side of the cooling pad 120 to increase absorbency of the sprayed moisture to the cooling pad 120 because air discharged from the axial flow fan 110 flows in the direction of the cooling pad 120.

Alternatively, the cooling pad can be detachably provided in the present invention instead of installing the pump and the sprayer. That is, when moisture of the cooling pad is insufficient by driving the second cooling device B, a user can detach the cooling pad to supply moisture and put it back to use it.

When the tank 130 is provided to cover a bottom of the cooling pad 120 and the cooling pad is soaked in refrigerant to absorb moisture, moisture is supplied to a certain level without having the pump 140 and the sprayer 150.

The second cooling device further includes a filter 160 provided at a side of the cooling pad for removing dirt in outdoor air. In more details, the filter 160 provided between the axial flow fan 110 and the cooling pad 120 or at the outlet side of the cooling pad for removing dirt flowed in together with outdoor air.

The first cooling device A and the second cooling device B are electrically connected to the control unit D. The control unit D alternatively drives either the first cooling device A or the second cooling device B according to outdoor air humidity measured by the humidity sensor.

The following is the cooling process by the second cooling device B. First of all, dry air of outside is sucked by the axial flow fan 110 and blown into the interior. Dirt in the blown air is removed when the air passes through the filter 160. Air passed the filter 160 passes through the cooling pad 120 for the humidifying and cooling process. The cooled air is supplied to the interior and cools the interior.

Meanwhile, when refrigerant stored in the tank 130 is pumped and sprayed by the sprayer 150, the sprayed refrigerant not only directly moisturizes dry air flowing into the interior but also replenishes the cooling pad 120 with moisture consumed during the humidifying and cooling process.

Hereinafter, a driving method for the cooling mode of the air conditioning system provided as mentioned above in best condition will be explained referring to the composition of the air conditioning system and drawings. That is, a driving method of reducing noises and vibrations, economizing electricity and properly ventilating indoor air will be explained referring to FIGS. 3A and 3B.

First of all, when power of the air conditioning system is on, the humidity sensor measures the humidity of outdoor air (S10). The driving method includes steps of comparing the humidity of outdoor air with predetermined humidity in the control unit (S20). That is estimating weather the humidity of outdoor air is higher than the predetermined humidity in the control unit.

When the humidity of outdoor air is higher than the predetermined humidity in the control unit after the steps above, the first cooling device is operated for cooling the interior by using the compressor to circulate the refrigerant.

On the contrary, when the humidity of outdoor air is lower than the predetermined humidity in the control unit, the second cooling device is operated to cool the interior by sucking outdoor air with low relative humidity to increase the relative humidity and supplying the high relative humidity air into the interior.

When the first cooling device is operated first (S31), the first cooling device keeps operating in a state that the interior is airtight and the indoor air becomes dry and dirty after a predetermined operating time. Therefore, it is desirable that the driving control method further includes a step of operating the second cooling device for ventilation of the interior after a predetermined operating time of the first cooling device (S40).

It is desirable to determine the ventilation period in consideration of relative humidity of outdoor air, air-conditioned temperature and the mean humidity at which level a user feel comfortable.

Also, the driving control method further includes a step of re-operating the first cooling device when the temperature of the interior is higher than the predetermined temperature, stopping the operation of the cooling system when the temperature of the interior is lower than the predetermined temperature (S50) after operating the second cooling device for ventilation of the interior for a predetermined operating time.

Meanwhile, if the second cooling device is operated first, the driving control method further includes a step of operating the first cooling device when the temperature of the interior is higher than the predetermined temperature, and stopping the operation of the second cooling device when the temperature of the interior is lower than the predetermined temperature (S60) after operating the second cooling device for a predetermined operating time.

An effect of the present invention formed as mentioned above is summarized as follows. First, according to the present invention, the first and second cooling devices are alternatively used according to the humidity of outdoor air in the air-conditioning mode and noises and vibrations are reduced compared to when the first cooling device is used only.

Second, according to the present invention, the first and second cooling devices are alternatively used according to the humidity of the outdoor air in the air-conditioning mode and the consumption of electricity is reduced. Driving the compressor consumes large amount of electricity.

Third, according to the present invention, the second cooling device is used for ventilation and for maintaining the interior temperature after the first cooling device is used for a predetermined time. When the first cooling device is used only, heat loss is large during the ventilation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An air-conditioning system, comprising:
   a first cooling device, comprising a compressor that compresses refrigerant, an outdoor heat exchanger that exchanges heat between the refrigerant and outdoor air, an indoor heat exchanger that exchanges heat between the refrigerant and indoor air, a passage control device that alternatively guides the refrigerant compressed in the compressor to one of the outdoor heat exchanger and the indoor heat exchanger according to a driving mode, and an expansion device that is provided between the outdoor heat exchanger and the indoor heat exchanger and that expands the refrigerant;
   a second cooling device, comprising a blower that forcibly draws in outdoor air and blows the outdoor air into an interior, and a humidifying device that is provided at an outlet side of the blower and that supplies moisture to outdoor air passing through the blower;
   a humidity sensor that measures humidity of outdoor air; and
   a control unit that is electrically connected to the first cooling device, the second cooling device and the humidity sensor, and that alternatively drives one of the first cooling device and the second cooling device according to outdoor air humidity transmitted from the humidity sensor in a cooling mode,
   wherein the first cooling device is operated by using the compressor to circulate the refrigerant and cool the interior when humidity of outdoor air is higher than predetermined humidity, and
   wherein the second cooling device is operated by drawing in outdoor air with low relative humidity, increasing the relative humidity through a humidifying and cooling process, and providing the cooled air into the interior to cool the interior when humidity of outdoor air is lower than predetermined humidity.

2. The air-conditioning system of claim 1, the blower further comprising:
   an axial flow fan.

3. The air-conditioning system of claim 1, the humidifying device further comprising:
   a cooling pad made of well-ventilated material and containing moisture.

4. The air-conditioning system of claim 3, the cooling pad of the second cooling device further comprising:
   a plurality of holes through which air passes.

5. The air-conditioning system of claim 2, the second cooling device further comprising:
   a filter that is provided at a side of the humidifying device and that removes dirt in outdoor air.

6. The air-conditioning system of claim 3, the second cooling device further comprising:
   a filter that is provided at a side of the humidifying device and that removes dirt in outdoor air.

7. The air-conditioning system of claim 6,
   wherein the filter is provided between the blower and the cooling pad.

8. The air-conditioning system of claim 2, the second cooling device further comprising:
   a tank that stores refrigerant.

9. The air-conditioning system of claim 8, the second cooling device further comprising:
   a pump that pumps the refrigerant stored in the tank; and
   a sprayer that sprays the pumped refrigerant into the cooling pad.

10. The air-conditioning system of claim 8, wherein the tank is provided to cover a bottom of the cooling pad.

11. The air-conditioning system of claim 10, the second cooling device further comprising:
    a pump that pumps refrigerant stored in the tank; and
    a sprayer that sprays pumped refrigerant into the cooling pad.

12. An air-conditioning system, comprising:
    a first cooling device, comprising a compressor that compresses refrigerant, an outdoor heat exchanger that exchanges heat between the refrigerant and outdoor air, an indoor heat exchanger that exchanges heat between the refrigerant and indoor air, a passage control device that alternatively guides the refrigerant compressed in the compressor to one of the outdoor heat exchanger and the indoor heat exchanger according to a driving mode, and an expansion device that is provided between the outdoor heat exchanger and the indoor heat exchanger and that expands the refrigerant;
    a second cooling device, comprising a blower that forcibly draws in outdoor air and blows the outdoor air into an interior, a cooling pad that is provided at an outlet side of the blower and that is made of well-ventilated material containing refrigerant, a tank that stores refrigerant, a pump that pumps refrigerant stored in the tank, a sprayer that sprays the pumped refrigerant into the cooling pad, and a filter that is provided at a side of an outlet of the cooling pad and that removes dirt contained in outdoor air;
    a humidity sensor that measures humidity of outdoor air; and
    a control unit that is electrically connected to the first cooling device, the second cooling device and the humidity sensor, and that alternatively drives one of the first cooling device and the second cooling device according to the outdoor air humidity transmitted from the humidity sensor in an air cooling mode,
    wherein the first cooling device is operated by using the compressor to circulate the refrigerant and cool the interior when humidity of outdoor air is higher than predetermined humidity, and
    wherein the second cooling device is operated by drawing in outdoor air with low relative humidity, increasing the relative humidity through a humidifying and cooling process, and providing the cooled air into the interior to cool the interior when humidity of outdoor air is lower than predetermined humidity.

13. The air-conditioning system of claim 12,
    wherein the filter is provided between the blower and the cooling pad.

14. The air-conditioning system of claim 12,
    wherein the tank is provided to cover the bottom of the cooling pad.

15. A method of driving an air-conditioning system, comprising:
    measuring humidity of outdoor air at a humidity sensor when the power of the air-conditioning system is on;
    comparing humidity of outdoor air with predetermined humidity; and
    operating a first cooling device by using a compressor to circulate a refrigerant and cool the interior when humidity of outdoor air is higher than predetermined humidity, and operating a second cooling device by drawing in outdoor air with low relative humidity, increasing the relative humidity through a humidifying and cooling process, and providing the cooled air into the interior to cool the interior when humidity of outdoor air is lower than predetermined humidity.

16. The method of driving the air-conditioning system of claim 15, further comprising:

operating the second cooling device for a predetermined time to ventilate the interior after operating the first cooling device for a predetermined time when the first cooling device is operated first.

17. The method of driving the air-conditioning system of claim 16, further comprising;

operating the first cooling device when a temperature of the interior is higher than a predetermined temperature after operating the second cooling device for a predetermined time, and stopping the operation of the air-conditioning system when the temperature of the interior is lower than the predetermined temperature after operating the second cooling device for a predetermined time.

18. The method of driving the air-conditioning system of claim 15, further comprising, when the second cooling device is operated first:

operating the first cooling device when a temperature of the interior is higher than a predetermined temperature after operating the second cooling device for a predetermined time, and stopping the operation of the second cooling device when the temperature of the interior is lower than the predetermined temperature after operating the second cooling device for a predetermined time.

19. The method of driving the air-conditioning system of claim 18, further comprising:

operating the second cooling device, before operating the second cooling device for the predetermined time.

* * * * *